United States Patent
Brinkmann et al.

(10) Patent No.: US 10,740,206 B2
(45) Date of Patent: Aug. 11, 2020

(54) RECORD-BASED PLANNING IN OPERATIONAL MAINTENANCE AND SERVICE

(71) Applicant: SAP SE, Walldorf (DE)

(72) Inventors: Lukas Brinkmann, Sandhausen (DE); Janick Frasch, Mannheim (DE); Jan Patrick Klein, Mannheim (DE); Axel Kuhle, Munich (DE); Markus Seidl, Weyarn (DE); Benjamin Fischer, Birkenau (DE)

(73) Assignee: SAP SE, Walldorf (DE)

(*) Notice: Subject to any disclaimer, the term of this patent is extended or adjusted under 35 U.S.C. 154(b) by 103 days.

(21) Appl. No.: 16/039,227

(22) Filed: Jul. 18, 2018

(65) Prior Publication Data

US 2020/0026632 A1 Jan. 23, 2020

(51) Int. Cl.
| | |
|---|---|
| *G06F 11/00* | (2006.01) |
| *G06F 11/30* | (2006.01) |
| *G06F 9/54* | (2006.01) |
| *G06F 11/07* | (2006.01) |
| *G06N 20/00* | (2019.01) |

(52) U.S. Cl.
CPC .......... *G06F 11/3089* (2013.01); *G06F 9/542* (2013.01); *G06F 11/0706* (2013.01); *G06N 20/00* (2019.01)

(58) Field of Classification Search
CPC ............. G06F 11/0751; G06F 11/0766; G06F 11/0769; G06F 11/0772; G06F 11/0775; G06F 11/0778; G06F 11/0781; G06F 11/0784; G06F 11/0787; G06F 11/08; G06F 11/14; G06F 11/1479; G06F 11/16; G06F 11/22
USPC ......................................................... 714/48
See application file for complete search history.

(56) References Cited

U.S. PATENT DOCUMENTS

| | | | |
|---|---|---|---|
| 8,117,061 B2 | 2/2012 | May et al. | |
| 8,401,819 B2 | 3/2013 | Kavaklioglu | |
| 9,311,615 B2 | 4/2016 | Davenport et al. | |
| 2004/0181422 A1 | 9/2004 | Brand | |
| 2006/0053347 A1* | 3/2006 | van Ingen ........... | G06F 11/0715 714/47.2 |
| 2008/0167842 A1 | 7/2008 | Cochran et al. | |
| 2008/0294374 A1 | 11/2008 | Guralnik et al. | |

(Continued)

FOREIGN PATENT DOCUMENTS

CN 105334841 A 2/2016

*Primary Examiner* — Sarai E Butler
(74) *Attorney, Agent, or Firm* — Mintz Levin Cohn Ferris Glovksy and Popeo, P.C.

(57) ABSTRACT

In some implementations, there is provided a method, which includes receiving, at a recommendation system, a failure notice representing a failure detected by a sensor monitoring an object; comparing, by the recommendation system, the failure notice to a plurality of reference failure notices to identify at least one matching failure notice, the comparing based on a domain-by-domain scoring between the failure notice and the plurality of reference failure notices; and generating, by the recommendation system, a message including a suggested solution including at least one task to remedy the failure, the suggested solution obtained from the at least one matching failure notice. Related systems, methods, and articles of manufacture are also disclosed.

20 Claims, 9 Drawing Sheets

(56) References Cited

U.S. PATENT DOCUMENTS

| | | | |
|---|---|---|---|
| 2012/0166879 A1* | 6/2012 | Watanabe | G06F 11/0751 |
| | | | 714/37 |
| 2013/0117267 A1* | 5/2013 | Buryak | G06F 16/93 |
| | | | 707/737 |
| 2014/0096251 A1* | 4/2014 | Doctor | H04L 63/1408 |
| | | | 726/23 |
| 2016/0004610 A1* | 1/2016 | Knight | G06F 11/203 |
| | | | 714/4.11 |
| 2016/0092808 A1 | 3/2016 | Cheng et al. | |
| 2016/0133066 A1 | 5/2016 | Lavie | |
| 2016/0321606 A1 | 11/2016 | Kapil et al. | |
| 2017/0083822 A1 | 3/2017 | Adendorff et al. | |
| 2017/0092021 A1 | 3/2017 | Nielsen et al. | |
| 2017/0102978 A1 | 4/2017 | Pallath et al. | |
| 2017/0169217 A1 | 6/2017 | Rahaman et al. | |
| 2019/0294484 A1* | 9/2019 | Luo | G06F 11/0778 |
| 2019/0312897 A1* | 10/2019 | Wang | H04L 63/10 |

\* cited by examiner

RECORD-BASED PLANNING IN OPERATIONAL MAINTENANCE AND SERVICE

TECHNICAL FIELD

The subject matter described herein relates generally to maintenance of physical objects including Internet of Things.

BACKGROUND

As the Internet of Things (IoT) evolves, increasing amounts of data will be generated to enable a variety of things. Although the data generation may be useful in some respects, it may present a bane to many given the immense volume of data IoT will surely lead to.

SUMMARY

In some implementations, there is provided a method, which includes receiving, at a recommendation system, a failure notice representing a failure detected by a sensor monitoring an object; comparing, by the recommendation system, the failure notice to a plurality of reference failure notices to identify at least one matching failure notice, the comparing based on a domain-by-domain scoring between the failure notice and the plurality of reference failure notices; and generating, by the recommendation system, a message including a suggested solution including at least one task to remedy the failure, the suggested solution obtained from the at least one matching failure notice.

In some variations, one or more features disclosed herein including the following features may optionally be included in any feasible combination. The failure notice may include a message received from the sensor comprising an Internet of Things sensor. The recommendation system may receive a message representing the failure, wherein the message is received from a user equipment. The domain-by-domain scoring may be determined by at least determining a first score for a similarity between the object and objects in the plurality of reference failure notices, a second score for a similarity with respect to problem code in the failure notice and the plurality of reference failure notices, and a third score for a similarity with respect to a text description in the failure notice and the plurality of reference failure notices. The domain-by-domain scoring may be determined by aggregating a score for each domain. The aggregate score may be normalized into a range of zero to 1. The domain-by-domain scoring may be determined based on a plurality of machine learning models, each domain having a corresponding machine-learning model to determine a sub-score which is aggregated to form an aggregate score. The generated message may be sent to at least a display associated with a user performing a solution to the failure. Feedback received from at least a display associated with a user performing a solution to the failure may be stored, wherein the feedback mapped to at least a portion of the plurality of reference failure notice and/or enabling scoring.

Implementations of the current subject matter may include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principals associated with the disclosed implementations. In the drawings.

FIG. 5A-FIG. 5B depicts examples of user interfaces used in conjunction with the systems and methods disclosed herein;

When practical, similar reference numbers denote similar structures, features, or elements.

DETAILED DESCRIPTION

Systems including enterprise resource management systems, asset management systems (an example of which is the SAP Enterprise Asset Management, EAM, system), or other types of systems may be used to support management of a company's physical assets (e.g., machines, parts, production lines, consumables, and/or the like) including, for example, the life cycle of the asset. A function of the enterprise asset management (EAM) system includes operational maintenance of one or more assets. For example, an EAM system may be used at a wind farm (e.g., a wind turbine generation facility) to manage the assets, such as the wind turbines and/or the like, although EAM may be used at other locations and/or with other types of objects (also referred to herein as assets). This management may include managing the maintenance of the assets including remedying failures, replacing parts (e.g., components of the assets), tracking, and/or the like.

Figure 1A:
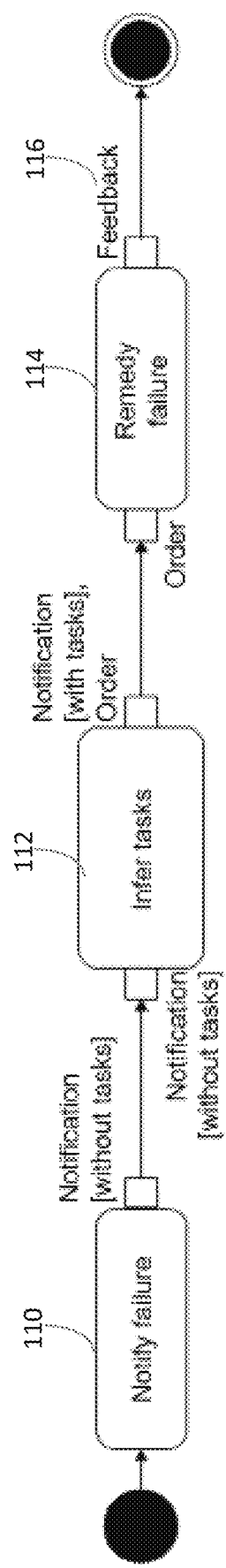
FIG. 1A depicts an example of a process for automatically generating a notification message in response to a failure notification.

FIG. 1A depicts an example of a process 100 for maintenance of an asset. For example, an EAM system may provide, at 110, notifications regarding a given failure of an asset that requires some form of maintenance, such as a corrective action. The failure notification may not include one or more tasks suggested to remedy the failure. However, the EAM system may, at 112, infer one or more tasks to remedy the failure. The failure notice including task(s) may then be used to generate an order (e.g., a work order), which may be sent to a user equipment, such as a computer, smartphone, tablet, and/or the like, to trigger the remedy of the failure. The EAM system may receive, at 116, some form of feedback, such as a corrective action that resolved the failure.

At FIG. 1A, the process 100 may store the notifications of failures, proposed solutions to remedy the failures (including the corresponding tasks), and/or feedback to document maintenance measures for a given asset. These data records may be used for long-term evaluation of the asset. To illustrate further, the failure notification may be processed in order to generate an order for a maintenance worker, such as a human or robot, to perform one or more tasks (which may be listed in the order in a given sequence) to remedy the failure that is the subject of the failure notice. After the failure is remedied, the feedback may list the tasks performed (and the given sequence of tasks if applicable) that actually remedied the failure or an indication of a task that was not helpful in remedying the failure. This process 100 can be highly variable as it depends at least on the diligence of the feedback provided after the repair/remediation of the failure.

Figure 1B:
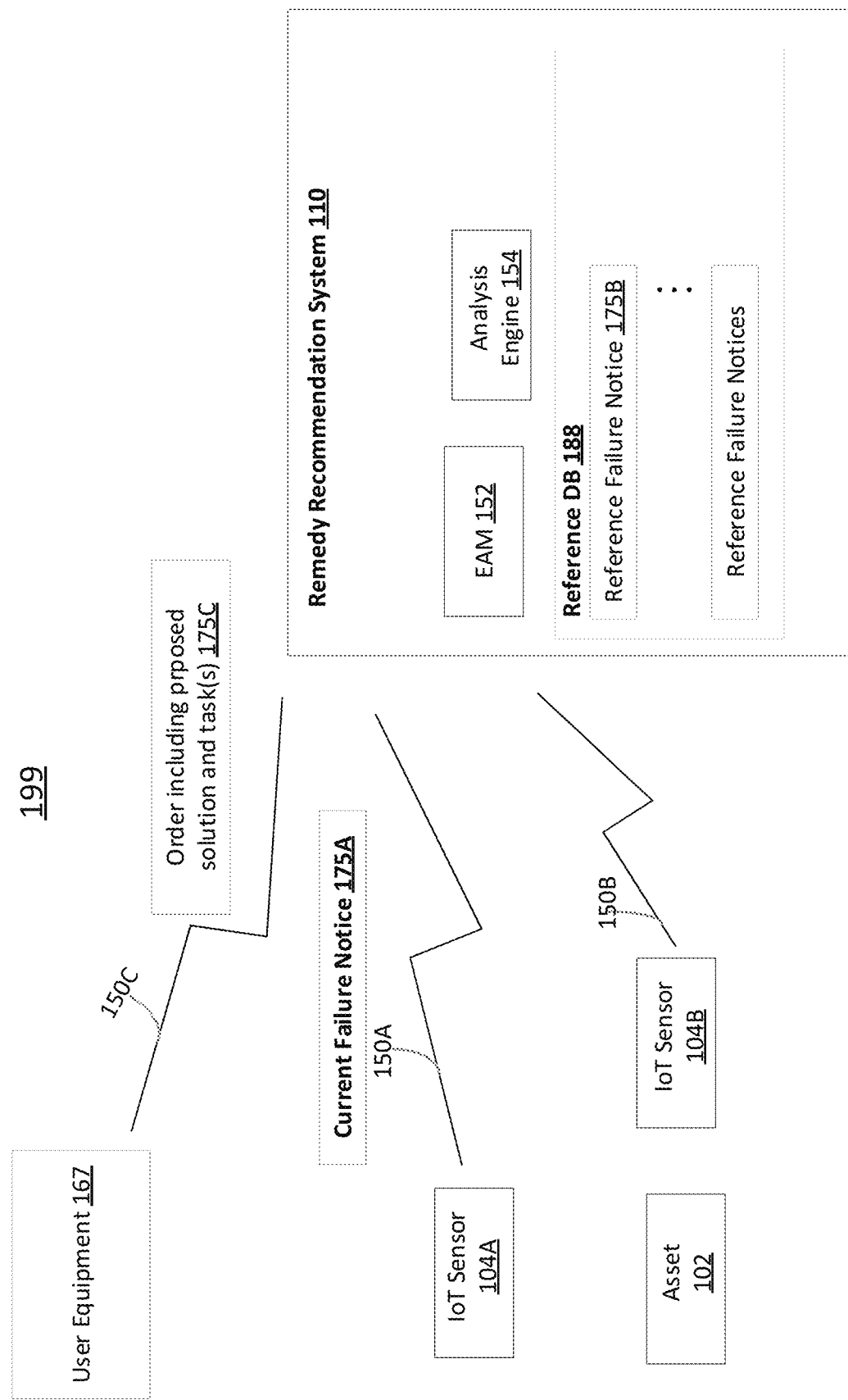
FIG. 1B depicts an example of a system.

FIG. 1B depicts an example system 199 including at least one asset 102. The asset may be any object, such as a device being manufactured, tested, and/or the like. For example, the asset may be at least a portion of a vehicle such as an engine at a factory, a wind turbine, pump, and/or any other asset. Alternatively or additionally, the asset may having one or more sensors, such as IoT sensors, measuring rotations per minute (RPM), pressure, and/or other values. The IoT sensors may be on, embedded in, and/or included in the asset and/or may be separate from the asset (in which case the IoT may remotely sense a value associated with the asset). Although the previous examples refer to specific types of assets, other types of assets may be used as well.

The system 100 may include at least one sensor, such as IoT sensors 104A-B, configured to collect, such as measure, monitor, actuate, and/or the like, one or more aspects of the at least one asset, such as asset 102. For example, a sensor may measure pressure, temperature, rotations per minute, and/or other values. Alternatively or additionally, the sensor may perform an action, such as turn off an asset, vary the operation of the asset, or perform some other type of action. The sensor, such as IoT sensor 104A and/or B, may include at least one processor and at least one memory. The sensor may also include a network interface, which may be wired and/or wireless such as a Bluetooth, Bluetooth Low Energy, WiFi, or other types of wireless technology. The sensor may include memory to store measured values as well. Moreover, the IoT sensor may operate using batteries or some other low power source. Alternatively or additionally, the IoT sensor may use slower speed processors, memories, and/or the like to reduce power consumption, when compared to, for example, a smartphone.

The sensors, such as IoT sensors 104A-B, may include connections 150A-B (e.g., wireless connections, such as cellular, WiFi, Bluetooth, and/or the like, network connections, Internet connections, and/or the like) to a recommendation system 110. In some example embodiments, the connections 150A-B may couple to a local device, such as a local server, router, gateway, smartphone, and/or the like, which further couples (via wired and/or wireless connections) to the recommendation system 110 (which may be located on premise with the IoT sensors and assets and/or may be located remotely, such as at a cloud server or other remote server).

In the example of FIG. 1B, the system 100 may further include a remedy recommendation system 110. The remedy recommendation system 110 may further include an EAM engine 152, an analysis engine 154, and/or a reference database 188, which may store and/or provide IoT sensor data, reference data regarding past failure notices (including corresponding remedies and tasks as well as associated sensor and other data for a give failure event), and/or other information to enable taking a current failure notice, such as 175A, and comparing it to past failure notices to identify at least one similar reference failure notice 175B that can be used to provide a recommended solution including tasks for the current failure notice. Additional examples of sensor data include: sensor events, continuous sensor signals, discrete sensor signal, calculated/derived signals (e.g., based on measured signals), signals that are results of applying algorithms (e.g., explicit mathematical calculations or even implicit data-dependent calculations like machine learning algorithms) to one or several raw measured signals.

The remedy recommendation system 110 may include one or more connections 150C (e.g., wireless links, such as cellular, WiFi, Bluetooth, and/or the like, network connections, Internet connections, and/or the like) to a user equipment, which may for example be associated with a maintenance worker handling the failure notice and/or handling the corresponding remedy, providing feedback, and/or the like. For example, a work order 175C may be sent via wireless connection 150C to user equipment 167 to help service the failure.

Figure 2:
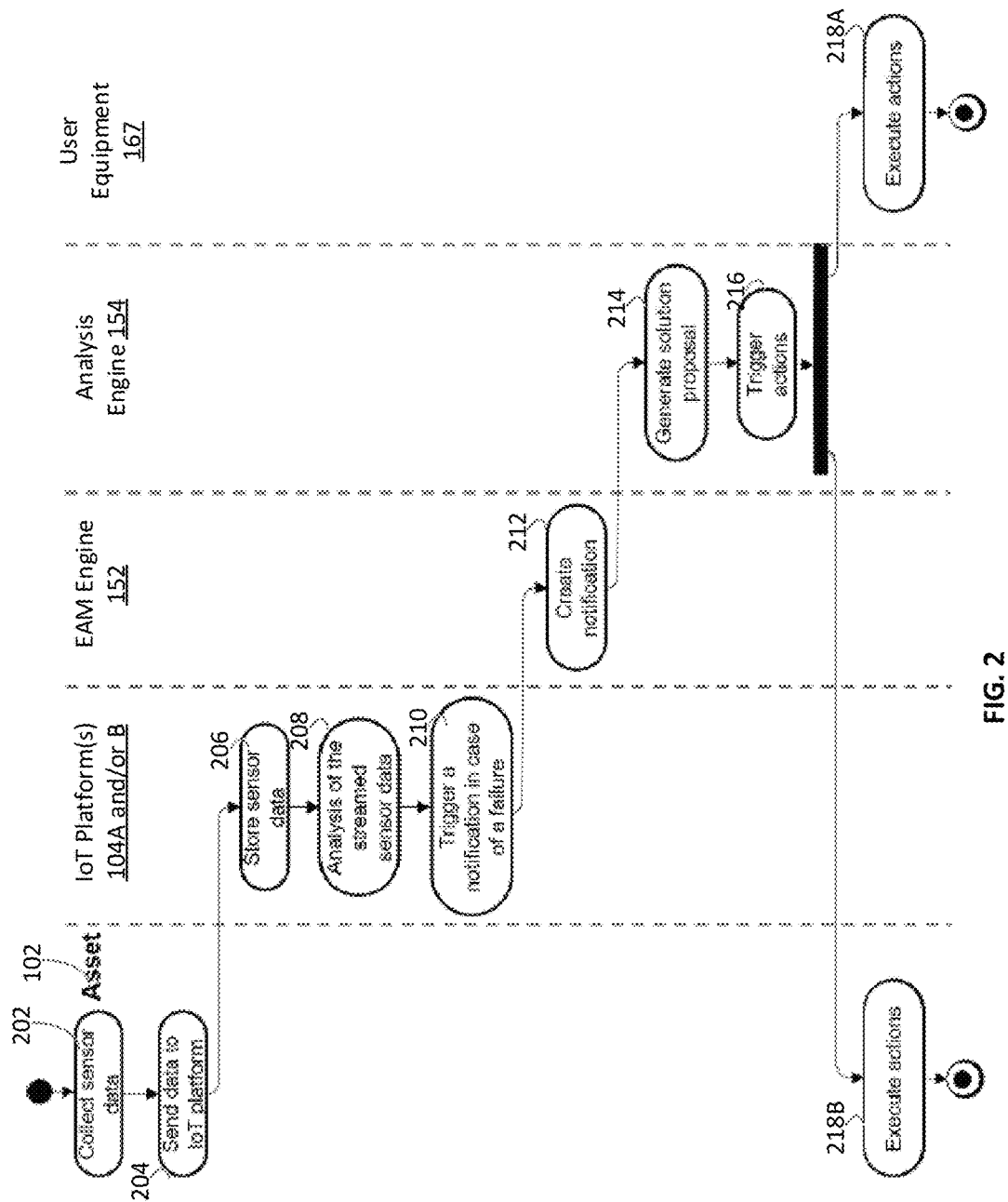
FIG. 2 depicts an example of a process for generating a suggested proposal to remedy a failure.

FIG. 2 depicts an example of a process 200 for handling failure notifications, in accordance with some example embodiments. The process 200 may provide an automated recommendation, such as a work order including one or more recommended tasks (which may be in a given sequence) to enable remedying the failure in an automated manner.

At 202, a sensor may collect sensor data from an asset. For example, a sensor, such as IoT sensor 104A, may collect, from an asset 102, sensor data. This sensor data may correspond to a measurement, observation, and/or the like. In some example embodiments, the IoT sensor 104A may perform the measurement on the asset 102. Alternatively or additionally, the asset may include sensors that may make measurements or collect information on the asset. In the example of FIG. 2, the asset, such as an object, may include a sensor that collects sensor data, at 202, and sends, at 204, the sensor data to an IoT sensor, such as IoT sensor 104A and/or 104B.

At 206, the IoT sensor, such as IoT sensor 104A and/or 104B, may store sensor data received from the asset 102. As noted, the IoT sensor may also perform its own measurements on the assets as well, in which case the sensor data may be stored along with other sensor data. Moreover, the IoT sensor 104A may collect the sensor data over time.

At 208, the IoT sensor may analyze the sensor data received to determine, at 210, whether to trigger a notification of a possible failure. For example, the sensor data received at 206 may be processed at 208 to determine, at 210, whether there is a possible failure event. To illustrate further, the IoT sensor 104A may analyze whether measured pressure, rotations per minute (RPM), temperature, and/or other measured values are indicative of a possible failure. To illustrate further, the IoT sensor may have threshold(s), such as a pressure threshold and/or an RPM threshold, which when crossed trigger a possible failure. This analysis at 208 may be performed at the IoT sensor alone. Alternatively or additionally, a server, such as a remote cloud server or a server local (e.g., a smartphone, computer, gateway, or other IoT sensor within the same wireless local area network), may alone, or in combination with IoT sensor 104A or B, perform the initial failure analysis to trigger, at 210, a possible failure. If the sensor data analysis at 208 indicates a possible failure, a notification may be sent, at 210, to remedy recommendation system 110, such as the EAM engine 152. For example, the IoT platform 104A may detect that a RPM measurement is over a threshold value, and trigger a notification to be sent to EAM 152 via connection 150A. The possible failure may be a current failure at the asset that needs to be remedied. The current failure may be prospective in the sense that the failure is being predicted (e.g., about to occur based on the sensor data). Alternatively or additionally, the current failure may represent an actual failure at the asset.

At 212, the remedy recommendation system 110 including the EAM engine 152 may create a notification of failure message. This failure notification may be provided to the analysis engine 154. The analysis engine 154 may generate, at 214, a recommended solution for the failure notification. The recommended solution may be in the form of a work order with one or more tasks to remedy the failure. The recommended solution may include alternative solutions and/or tasks to remedy as well. Additional examples of notification messages include: maintenance requests, malfunction reports, activity reports, problem notifications, and/or the like.

Although some of the examples describe the notification at 212 being triggered in response to an IoT device, other events may trigger the notification at 212 as well (e.g., message from a user device/equipment such as an email from a user, technician, and/or the like creating a trouble ticket or other type of initial message regarding a possible failure).

At 216, the analysis engine may trigger one or more actions 218A-B. For example, the action 218A may include sending the recommended solution(s) as a work order to user equipment 167. Alternatively or additionally, the actions 218B may include sending a message to the asset 102 or sensor 104A or B itself. For example, the action 218B may be a message indicating an action at the asset, such as turn off the asset, vary an aspect of the asset (e.g., slow down a motor, open a vent, etc.).

In some example embodiments, a machine learning model (e.g., neural network or other form of form of machine learning or artificial intelligence), may be used to generate the recommended solution at 214 and the one or more tasks generated at 216. The machine learning may be included in the analysis engine 154, which may be configured to recommend a solution and corresponding task(s) (e.g., a measure to remedy the failure and/or replacement component(s)) for the notification based on stored data, such as the reference database 188 including a historical database of EAM, user feedback 168 and/or other information.

The remedy recommendation system 110 may be configured for records-based planning solutions to remedy a failure. When this is the case, the failure notifications may be mapped, in reference database 188, to a proposed solution (e.g., a recommended solution including one or more tasks) as follows:

notification X→answer Y.

To that end, the remedy recommendation system 110 may have each answer mapped to a given type of failure notifications, and these mappings may be stored in persistent storage, such as a reference database 188. The answers may be obtained by feedback or some other verified mechanism. Based on the reference collection of notifications and answers (which may include verified successful remedies for each notification message for a given failure) at the reference database 188, the notifications and answers in the reference database may be represented as follows:

$notifcations_{DB} \rightarrow answers_{DB}$.

For a given notification of a failure X, a failure notification message may be generated indicating the failure with a given remedy (represented below with the answers B and Y representative of tasks to remedy the notification's failure):

notification X→(most similar)notification A with answer B→answer Y.

To illustrate further, the remedy recommendation system 110 may need to identify a recommendation for a failure notice, such as current failure notice 175A (FIG. 1A). To that end, the remedy recommendation system 110 may identify at least one reference failure notification 175B in the reference database 188 that is similar to the currently received notification 175A. In this example, the remedy recommendation system 110 identifies reference notification "A" 175B as being similar to current notification "X" 175A. Given reference notification A, the reference database 188 may also include one or more tasks (which are mapped to the reference notification A as the answer) to resolve the failure.

In order to identify similar failures as the one listed in a current failure notification 175A message, the remedy recommendation system 110 may perform a comparison of similar failure notification data records in the reference database 188. For example, a scoring system may be used to compare the current notification's failure 175A with the failures of the reference failure notifications 175B and/or the like in the reference database 188.

For a given current failure notification such as current failure notification 175A, there may be different data domains, which are relevant for the similarity comparison between the current failure notification and the stored, reference failure notifications in the reference database 188. These domains may include notification type, maintenance object (e.g., the object under maintenance), problem code(s) (e.g., a code that maps to a problem), free text problem description (e.g., "pump has a leak," "generator not working,", and/or the like), and/or sensor data from a time window of configurable length before the failure event. Additional example of domains include documents of any kind (e.g., user manuals, maintenance instructions, websites), pictures, videos, audio, 3D models, geo data/geo coordinates, weather data, social media data, demographic data, and/or the like. The domains thus represent different types of data which may be associated with a failure.

Moreover, the remedy recommendation system 110 may take into account feedback information, which may be feedback from users such as maintenance workers. The feedback may be indicative of whether the recommendation including actions remedied in some way the failure.

In some implementations, the remedy recommendation system 110 may collect tasks (e.g., work orders) and components configured by the user; user feedback on individual retrieved historic incidents (e.g., user clicks this proposal is irrelevant"); and/or feedback from a maintenance worker on whether the proposed solution was successful or not. This collected information may be stored in the reference database 188 to enable identifying reference failure notifications in response to a received current failure notification. The accuracy of the identified reference failure notification matching the current failure may increase over time given the recorded information. The reference database may also collect past, or reference, event information directly from the user actions. For example, if a user rejects a solution proposal, the remedy recommendation system 110 may notice the rejection and may store the rejection information in a database, such as database 188. When the remedy recommendation system 110 generates another solution proposal, the remedy recommendation system 110 may give the previously rejected proposal a lower score (based on user feedback), when compared to other solution proposals. Likewise, user feedback may increase the score of a solution proposal as well.

Moreover, user feedback regarding whether the proposed solution and tasks worked at remedying the failure may be provided to individual machine learning algorithms at the analysis engine 154 for each similarity domain as a ground truth for re-training. For example, each data domain may have a corresponding machine-learning model, such as a neural network or other type of machine learning. These domains may include information that may help with distinguishing relevant from irrelevant reference failure incidents, when a current notification is received.

In some example embodiments, a meta-model may be used to score the similarity of two failure notifications, such a current notification and a reference notification. The meta-model may be implemented across data domains. For example, the different domains of the notifications X and A individually may be analyzed. To illustrate further, two notifications may be compared by first comparing them, on a domain-by-domain basis, such as problem code by problem code, free text by free text, sensor data by sensor data, and/or the like. An advantage of this domain-by-domain approach is it is amendable to machine learning techniques for the comparison in each domain. For example, each data domain may have a corresponding machine-learning algorithm, such as a neural network or other type of machine learning.

When the data domain is text, word embeddings trained on a specific corpus with transfer learning applied to the specific domain of maintenance of the considered asset class for the desired application domain may be used. Moreover, domain deep learning models adapted to the desired application domain. In the case of the sensor data domain, pretrained models for a specific asset class may be used. Moreover, so-called semi-empirical models that originate in the underlying physical working principles and in which calculations are based on a combination of observed associations between variables and theoretical considerations relating variables through fundamental principles (e.g., a manufacturer of equipment knows the physical behavior of his equipment and defines a function to calculate a domain score). These can be combined with data driven models purely data-driven models, such as neuronal networks (in particular deep learning), support vector machines, robust regression, 1-class support vector machines for unsupervised learning, and/or the like.

The similarity within each domain i may be expressed in a domain score $s_i$. The domain scores may be normalized by mapping them into an interval, such as the interval from zero to one ($s_i$: [0; 1]) to ensure scale invariance and comparability across the different domains. Next, the different domain scores may be aggregated to form a similarity score S by using a suitable aggregation function (such as weighted average scores or averaged quantile/percentile scores, for example):

For example, the more similar a reference notification is to the current notification X, the higher is the similarity score. Consequently, the notifications with the highest similarity score are the basis for the proposed recommendation including task(s) to remedy the failure of the asset. For example, the reference notification with the highest score may be retrieved, and the solution including tasks may be provided as a proposed solution to the current failure notification being handled. Alternatively or additionally, the reference notification that are $2^{nd}$ or $3^{rd}$ highest in score may be retrieved, and the solution including tasks may be provided as, for example, alternative proposed solution to the current failure notification being handled.

Figure 3:
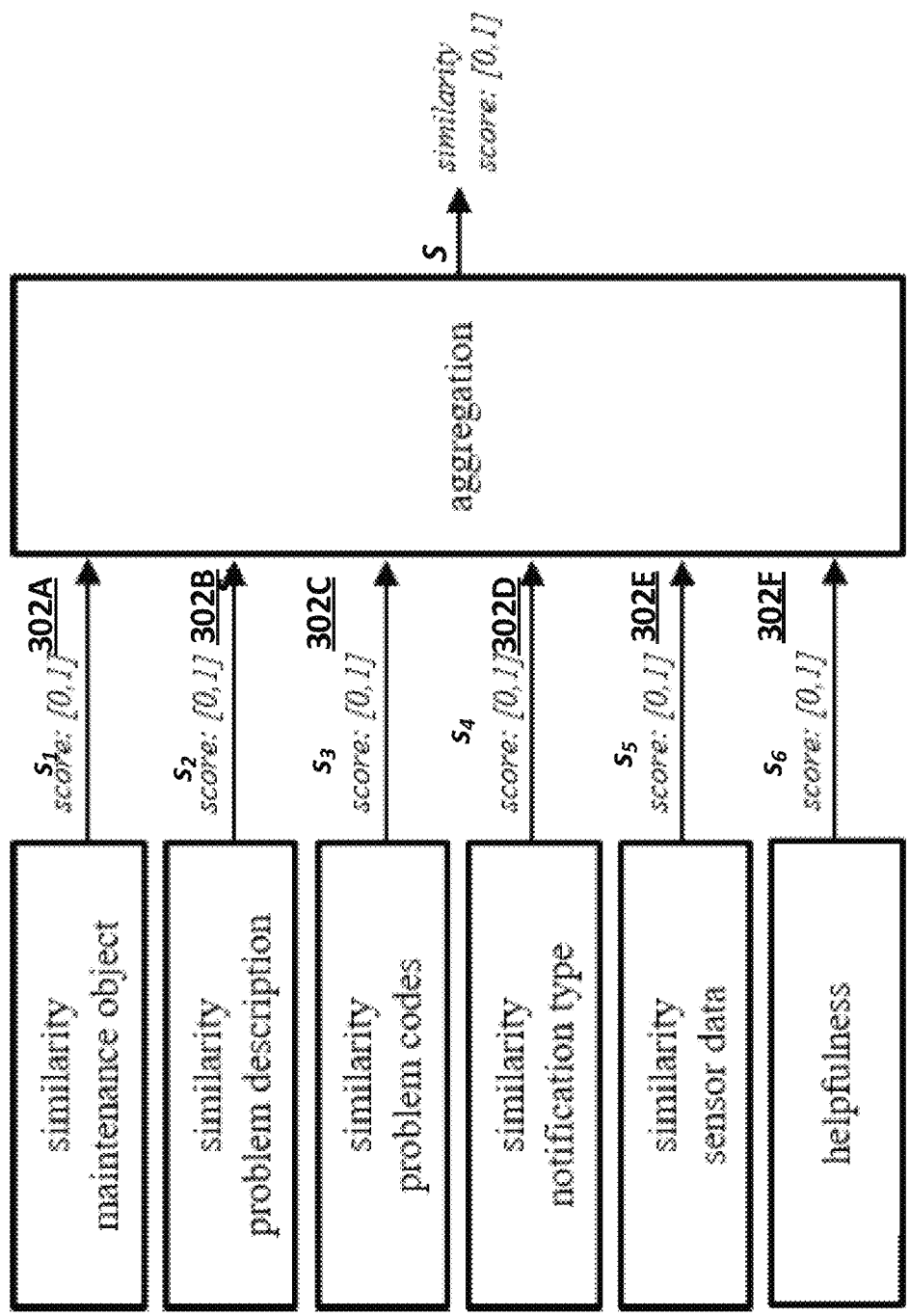
FIG. 3 depicts an example model for comparing failure notifications based on multi-domain scoring.

FIG. 3 graphically depicts the calculation of the similarity score for a given notification. In the example of FIG. 3, sub-scores $s_1$-$s_6$ 302A-F are calculated for each of the data domains, which in this example correspond to maintenance object, problem description, problem codes, notification type, sensor data, and helpfulness (which represents feedback). These sub-scores 302A-F are aggregated, as noted, to form the score, S, 304.

Although 6 data domains are listed in FIG. 3, this is an example as other types and quantities of domains may be used as well.

Referring again to FIG. 2 at 218A-B, after a similar reference notification, such as reference failure notice 175B, is identified (based on the scoring) for a current notification such as notice 175A, one or more tasks (e.g., actions) may be triggered for an asset. For example, a task may include an action 218B such as sending an indication to the asset 102 or a corresponding IoT sensor 104B. This action may be, for example, shut down the asset. In the case of a pump for example, the asset may need to be shut off to prevent irreparable damage. For the identified reference notification, the remedy recommendation system 110 may propose one or more tasks (which may be mapped to the reference failure notice) that can be used to remedy the failure. These tasks may represent tasks for a maintenance worker to perform to remedy the task. For example, a recommended solution including the tasks may be sent to a user equipment 167 associated with a user, such as a maintenance worked. In some instances, alternative tasks are provided from which the maintenance worker may select as part of the remedy. Tables 1 and 2 below depict an example set of tasks.

TABLE 1

| id | code | description |
|---|---|---|
| 1 | 1003 | Photo to work preparation |
| 2 | 1003 | Replace shaft as per A-Plan 14 |
| 3 | 1003 | Replace tube as per B-Plan 151 |

TABLE 2

| material number | description | amount |
|---|---|---|
| V-2221 | Mechanical shaft | 1 |
| V-32322 | Pipe, short | 2 |

Figure 4:
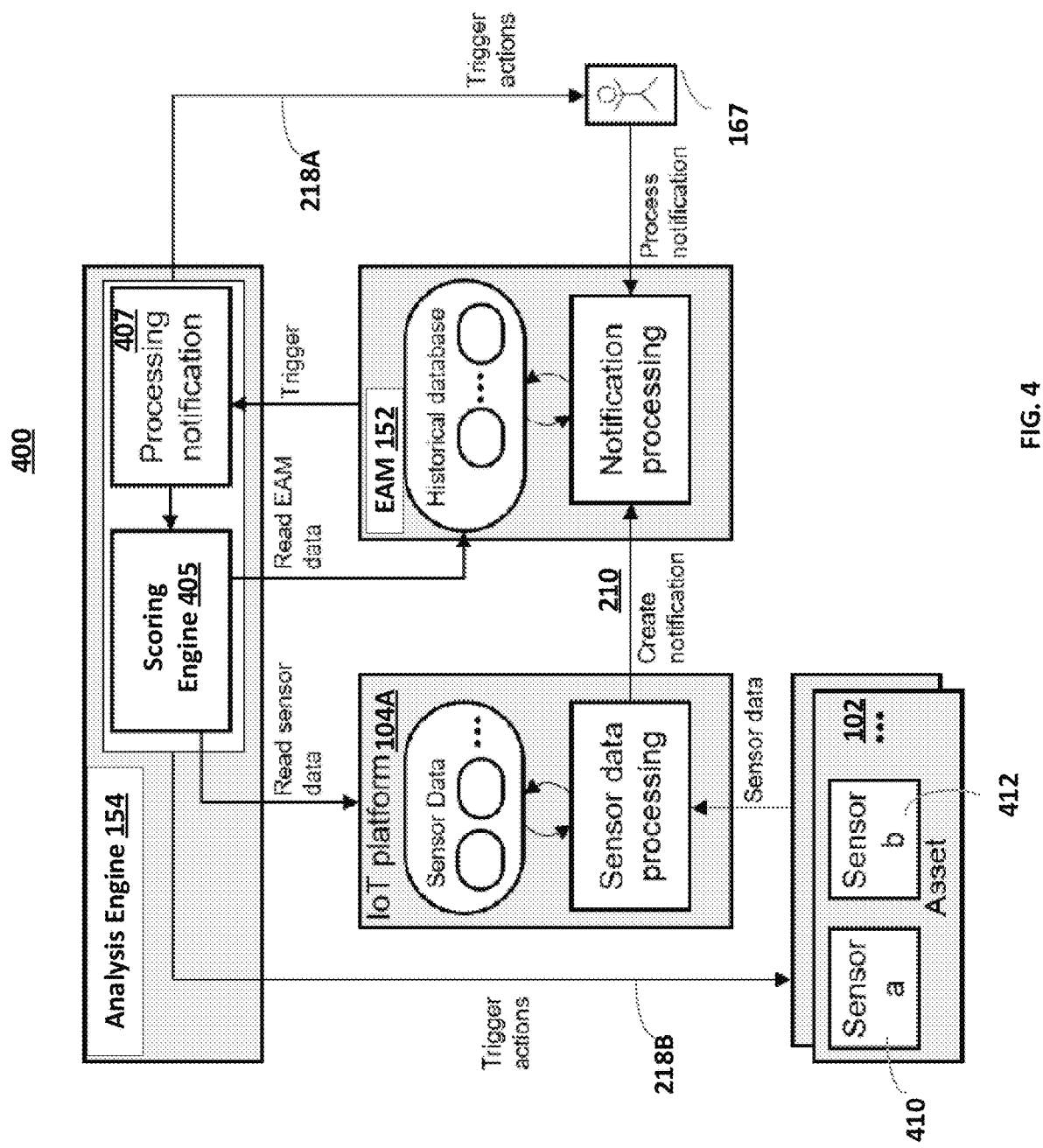
FIG. 4 depicts an example of a system including IoT sensors.

FIG. 4 depicts another example of a system 400, in accordance with some example embodiments. System 400 is similar to system 100 in some respects. System 400 depicts an analysis engine 154, which further includes the scoring engine 405 for scoring notifications as disclosed above with, for example, FIG. 3 and the like. For example, the scoring engine may use a domain-by-domain scoring to compare a current failure notification, such as failure notice 175A, to reference failure notices, such as notice 175B. The analysis engine 154 may further include notification processing 407 configured as a handler to handle the failure notices and other messages. Notification processing 407 may perform preprocessing of the data received from, for example, an ERP system in order to enable analysis by system 400. For example, the notification processing engine 407 may perform preprocessing of the problem description, parsing images of the problem into arrays to calculate the similarity in the processing engine, and/or the like.

The asset 102 may, as noted, include sensors, such as sensors 410-412 and/or the like. The sensor data may be provided to another sensor and/or a server, which may be local to the asset and/or remote from the asset. For example, the sensor data generated by the sensors may forwarded to an IoT sensor (or platform) 104A, which may be configured to receive sensor data from one or more other sensors, process the sensor data, store sensor data, forward sensor data to other devices (e.g., EAM 152, analysis platform 154, and/or the like), generate sensor data, perform measurements, trigger actions, actuate, and/or the like. In the example of FIG. 4, the IoT platform 104A may, as noted, generate notifications of a possible failure at the asset. The notification may include one or more sensor values as well as other information related to the failure event (e.g., problem description, error codes, and/or the like). The EAM 152 may also trigger notification processing 407 to enable scoring by the scoring engine.

The system 400 may monitor and store the sensor data from a portion of an asset, such as a wind power generator. In this example, the monitored sensor data may include motor pitch (e.g., position detection and speed measurement), blade bearing (e.g., position detection), pitch system control of rotor blade position, control of temperature management, measurement of tower oscillation, position detection and speed measurement of the generator's slip ring, position and speed measurement on the main shaft of the power train, speed measurement of the generator, position detection of the nacelle, and/or other values related to the wind power generator. If the sensor data indicates an anomalous behavior, an IoT platform may trigger, at 210, the creation of a notification in the EAM. As soon as a notification is created, the meta-model (e.g., the domain-by-domain scoring model such as the one depicted at FIG. 3) may generate, at 214, a proposed recommendation to remedy/solve the anomalous behavior. This may trigger actions, at 218B, at the affected wind power plant, such as run the wind power generator at a slow rate, shut down the turbine, and/or some other type of action. The analysis engine 154 may also send a message, such as a report or other indication, to the user equipment 167 associated with a user, such as a maintenance worker or some other user. This message may include a set of actions, such as task(s) to remedy the current failure at the asset, which in this example is the wind power generator. In this way, the maintenance worker may be able to pick at least one solution (comprising tasks). Alternatively, the message may include alternative solutions, which can be picked entirely or in part to remedy the failure. The result is a set of actions, such as the tasks. The set of actions may include replacement parts or components as well.

Figure 5A:
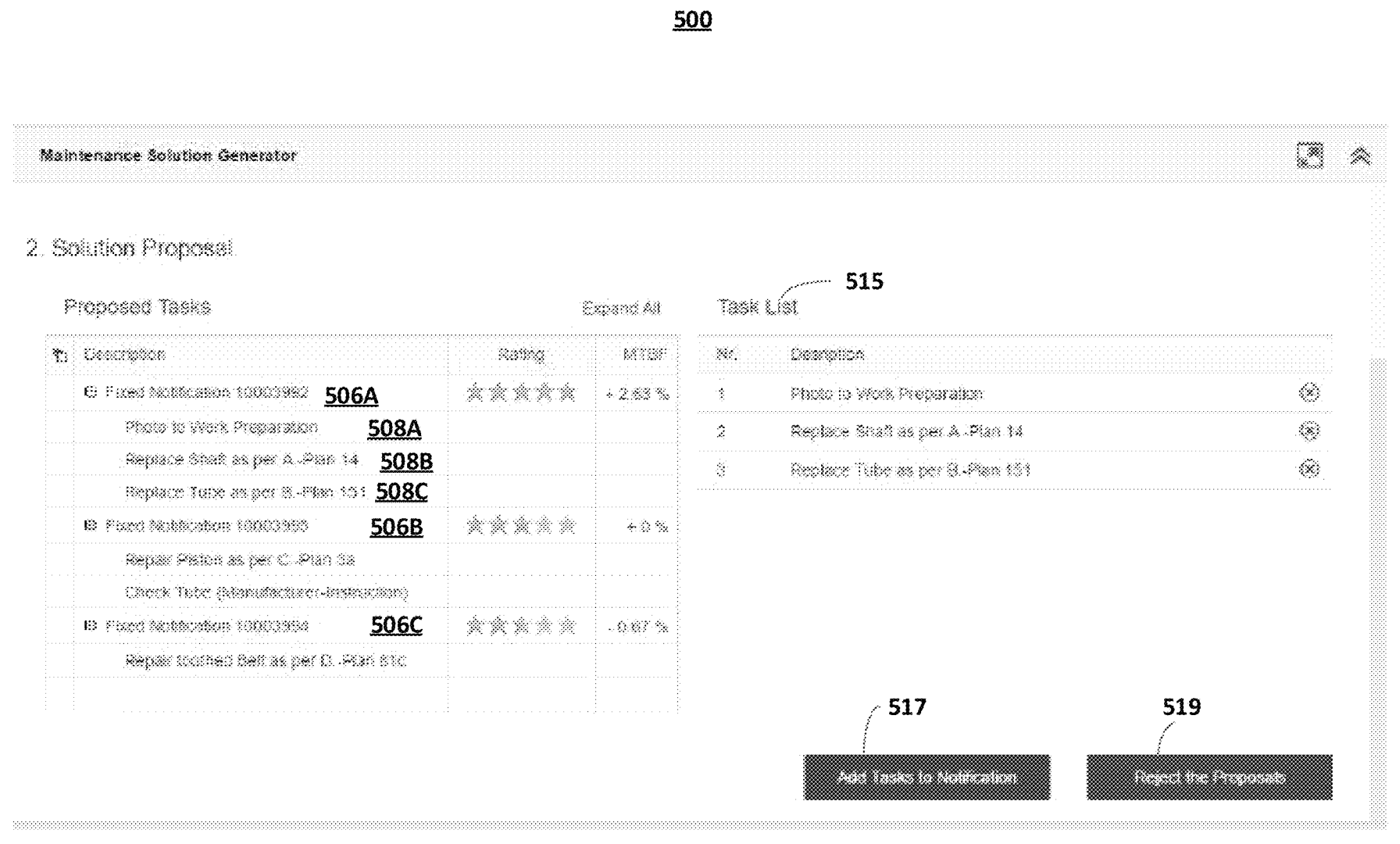

FIG. 5A depicts an example of a user interface 500, in accordance with some example embodiments. The user interface 500 may be presented at user equipment 167. For example, the remedy recommendation system 110 may send to the user equipment 167 the information depicted at FIG. 5A in the form of a recommended solution. In this example, the user interface 500 lists three failure notifications 502A-C, each is followed with a proposed list of tasks to remedy the failure associated with the to remedy the current failure. For example, current failure notice 506A includes three tasks 508A-C to remedy the failure. The task list 515 is a port of the user interface including a list of proposed tasks (some of which are from 508A-C on the left hand side of the user interface). The proposed tasks can be amended via the user interfaces as a way of providing feedback on the remedy to fix to notification message 506A. For example, a task can be added or an existing task can be deleted or modified. To send the feedback in the form of the task list 515, 517 can be selected to indicate an added or amended task. Likewise, 519 can be selected to reject all of the displayed proposals at 515 (which in this example includes tasks 506A-C). When the rejection is triggered 519 as feedback, this may cause another list of proposed tasks to be listed at 515.

Figure 5B:

Referring to FIG. 5B, the stars 566A-C next to a solution proposals at 506A-C indicate the total score of the solution proposal (e.g., with five stars as the highest rating). When hovering the total star rating 566A for example, a message window 568 appears giving additional detail into the calculation of the total score by showing the scoring in each domain of the proposed scoring system. The score in each category is again visualized in a star rating, although other scoring systems may be used as well. At FIG. 5B, the solution proposal 566A has a maximum score (which in this example is 5 stars) based on the maximum score in each of the scoring domain, while the proposal 566C has only 3 stars indicating the lower score of this proposal (and perhaps a less preferred or effective solution to its problem).

The following provides additional examples with respect to determining scores. For example, a current failure notification may include a text description of the failure (e.g., a "free text" describing the failure). To compute a score for a failure notification in this free text domain, machine learning may be used to compare the free text in the current failure notice to one or more reference failure notice to identify a match (which is the same or similar within a given threshold or error tolerance).

In the case of user feedback scoring, the user feedback may be an indication such as yes or no (e.g., "Was the solution and tasks in the work order notification helpful?").

To calculate a score for this domain, the remedy recommendation system 110 may determine a score based on a net promoter score (NPS) that is normalized by a function such as a sigmoid function. The net promoter score may be determined as follows:

$$NPS = \#positivefeedback - \#negativefeedback \quad (1)$$

$$score = sig(NPS) = \frac{1}{1+e^{-NPS}} \quad (2)$$

wherein the NPS sums the positive results (e.g., yes) and subtracts the count of the negative results (e.g., no), and the normalizes the result between 0 and 1 using, for example, a sigmoid.

The following provides an example of aggregating subscores as noted above with respect to FIG. 3. Supposing a failure notification with the following domain scores:
Notification type: 0.6,
Maintenance object: 1,
Problem codes: 0.3,
Free text problem description: 0.4,
Sensor data: 0.9 and
Helpfulness: 0.8.
The aggregate similarity score may be determined as an average as follows:

$$S = \frac{1}{6} * \sum i = 16 s_i \quad (3)$$

With Equation 3, the example failure notification would receive an aggregate similarity score to a given reference failure notice of:

$$S = \frac{0.6 + 1 + 0.3 + 0.4 + 0.9 + 0.8}{6} = 0.67. \quad (4)$$

Additionally or alternatively to Equation 3, other forms of user feedback may be taken into account as well. For example, a total quantity of positive feedback divided by the total amount of feedback. Moreover, a sigmoid function with positive value range (e.g., 0,1) may be applied to normalize the score into a range. Moreover, although some of the examples refer to using a sigmoid for normalization, other monotonous functions may be used as well (e.g., a rectilinear function, a saturated non-linear functions, and/or the like). Furthermore, a machine learning algorithm that is specifically trained to determine relevance of a remedy recommendation based on user feedback (quantity, or degree, of positive feedback, quantity of negative feedback), and outputs a numeric value may be used as well. Moreover, multi-valued feedback beyond a binary (e.g., yes/no question) may be captured and included as well.

Figure 5C:
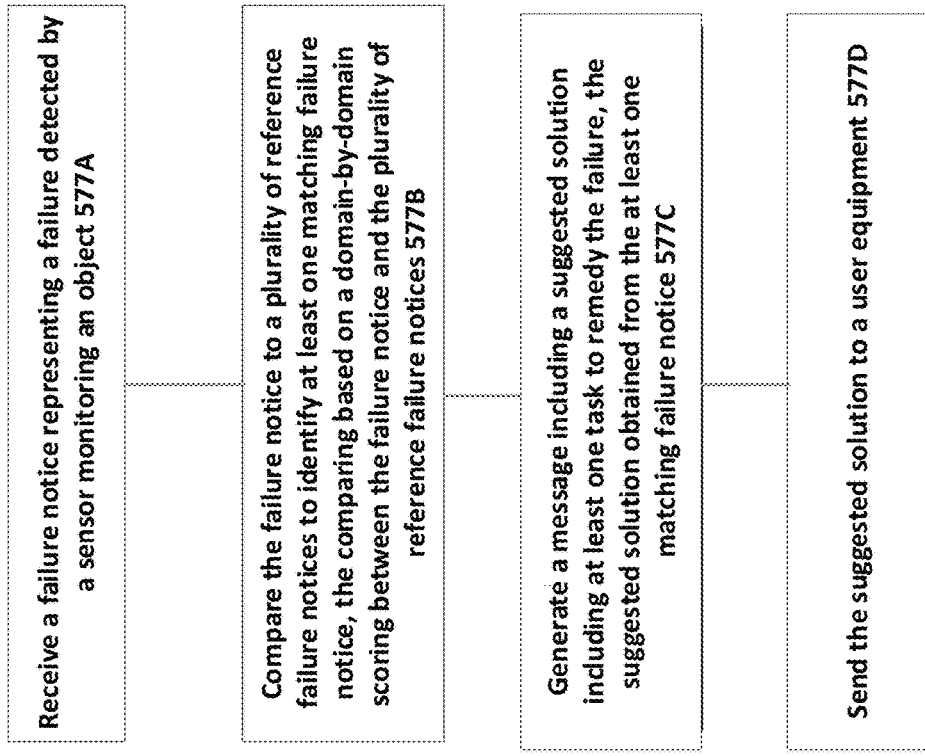
FIG. 5C depicts an example of a process, in accordance with some example embodiments.

FIG. 5C depicts an example of a process, in accordance with some example embodiments.

At 577A, a failure notice may be received. For example, the recommendation system may receive a failure notice representing a failure detected by a sensor, such as an IoT sensor, monitoring an object, such as asset 102. The failure notice may also be received from other devices. For example, a user device/equipment may send an email, SMS message, or other type of message indicating a failure. This message may be from a user, technician, and/or the like associated with the user device. For example, the email or SMS message may represent a trouble ticket or other type of initial message regarding a possible failure, which may be received at 577A as well.

At 577B, a comparison may be performed. For example, the recommendation system may compare the failure notice to a plurality of reference failure notices to identify at least one matching failure notice. To illustrate further, the information in the failure notice may include information indicative of the "pump stopped working." When this is the case, the recommendation system may compare based on the "pump stopped working" information. In some example embodiments, a matching failure notice in database 188 may be identified during the comparison based on the domain-by-domain scoring model disclosed herein.

At 577C, a message including the suggested solution may be generated. For example, the recommendation system may generate a message including the suggested solution including at least one task to remedy the failure, the suggested solution obtained from the at least one matching failure notice. Moreover, this message may include a sequence of tasks and/or dependent tasks that depend on the success of a prior task (e.g., perform task A, and if successful do B, but if not successful do C).

At 577D, the generated message may be sent. For example, the recommendation may send the message (via one or more networks including wireless networks) the message to a user equipment, such as a smartphone, tablet, computer, and/or other type of processor-based device coupled to a network, such as the Internet, cellular network(s), and/or the like. The user equipment may be associated with a user, such as a technician responsible for performing the fix/solution as well as other users. The message may be sent to other machines as well including other user equipment, IoT devices, databases, and/or the like.

Figure 6:
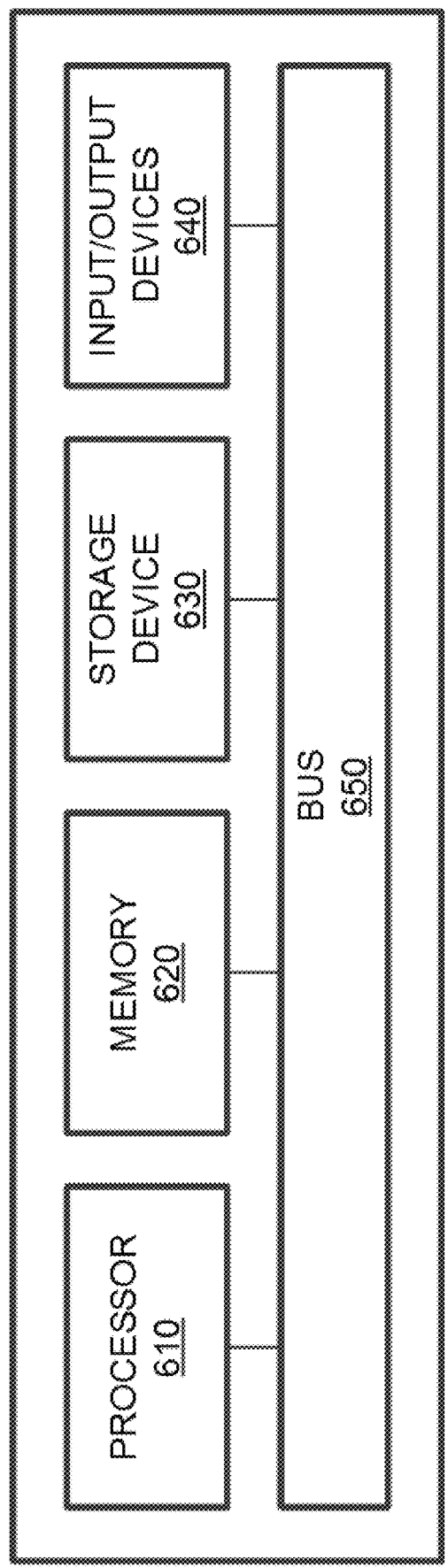
FIG. 6 depicts an example of a processing system.

FIG. 6 depicts a block diagram illustrating a computing system 600, in accordance with some example embodiments. The computing system 300 may be used to implement the recommendation system 110, user equipment, IoT sensor, and/or any components therein.

The computing system 600 may include a processor 610, a memory 620, a storage device 630, and input/output devices 640. The processor 610, the memory 620, the storage device 630, and the input/output devices 640 may be interconnected via a system bus 650. The processor 610 is capable of processing instructions for execution within the computing system 600. Such executed instructions may implement one or more components of, for example, recommendation system 110 including process 100, 200, and/or the like. In some example embodiments, the processor 610 may be a single-threaded processor. Alternately, the processor 610 may be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 may store data structures representing configuration object databases, for example. The storage device 630 is capable of providing persistent storage for the computing system 600. The storage device 630 may be a solid-state drive, a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 may provide input/output operations for a network device. For example, the input/output device 640 may include Ethernet ports or other networking ports to communicate with one or more wired and/or wireless networks (e.g., a local area network (LAN), a wide area network (WAN), the Internet).

In some example embodiments, the computing system 600 may be used to execute various interactive computer software applications that may be used for organization, analysis and/or storage of data in various formats. Alternatively, the computing system 600 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 640. The user interface may be generated and presented to a user by the computing system 600 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random query memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method comprising:
   receiving, at a recommendation system, a failure notice representing a failure detected by a sensor monitoring an object;
   comparing, by the recommendation system, the failure notice to a plurality of reference failure notices to identify at least one matching failure notice, the comparing based on a domain-by-domain scoring between the failure notice and the plurality of reference failure notices, the comparing further comprising comparing, in a first domain using a first machine learning model trained for the first domain, a problem code of the failure notice to corresponding problem codes in the plurality of reference failure notices, comparing, in a second domain using a second machine learning model trained for the second domain, a free text of the failure notice to corresponding free texts in the plurality of reference failure notices, and comparing, in a third domain using a third machine learning model trained for the third domain, the object of the failure notice to corresponding objects in the plurality of reference failure notices; and
   generating, by the recommendation system, a message including a suggested solution including at least one task to remedy the failure, the suggested solution obtained from the at least one matching failure notice.

2. The method of claim 1, wherein the failure notice comprises a message received from the sensor comprising a wireless Internet of Things sensor.

3. The method of claim 1 further comprising:
   receiving, at the recommendation system, a message representing the failure, wherein the message is received from a user equipment.

4. The method of claim 1 further comprising: determining the domain-by-domain scoring by at least determining a first score for a similarity between the object and the corresponding objects in the plurality of reference failure notices, a second score for a similarity with respect to problem code in the failure notice and the corresponding problem codes in the plurality of reference failure notices, and a third score for a similarity with respect to the free text description in the failure notice and the corresponding free texts in the plurality of reference failure notices.

5. The method of claim 1 further comprising: determining the domain-by-domain scoring by aggregating a score for each domain.

6. The method of claim 5 further comprising: normalizing the aggregate score into a range of zero to 1.

7. The method of claim 1 further comprising: determining the domain-by-domain scoring based on the first machine learning model, the second machine learning model, and the third machine learning model, each domain having a corresponding machine learning model to determine a sub-score which is aggregated to form an aggregate score.

8. The method of claim 1 further comprising: sending the generated message to at least a display associated with a user performing a solution to the failure.

9. The method of claim 1 further comprising: storing feedback received from at least a display associated with a user performing a solution to the failure, wherein the feedback mapped to at least a portion of the plurality of reference failure notices and/or enabling scoring.

10. A system comprising:
    at least one processor and at least one memory including program code which when executed by the at least one processor causes operations comprising:
    receiving, at a recommendation system, a failure notice representing a failure detected by a sensor monitoring an object;
    comparing, by the recommendation system, the failure notice to a plurality of reference failure notices to identify at least one matching failure notice, the comparing based on a domain-by-domain scoring between the failure notice and the plurality of reference failure notices, the comparing further comprising comparing, in a first domain using a first machine learning model trained for the first domain, a problem code of the failure notice to corresponding problem codes in the plurality of reference failure notices comparing, in a second domain using a second machine learning model trained for the second domain, a free text of the failure notice to corresponding free texts in the plurality of reference failure notices, and comparing, in a third domain using a third machine learning model trained for the third domain, the object of the failure notice to corresponding objects in the plurality of reference failure notices; and
    generating, by the recommendation system; a message including a suggested solution including at least one task to remedy the failure, the suggested solution obtained from the at least one matching failure notice.

11. The system of claim 10, wherein the failure notice comprises a message received from the sensor comprising a wireless Internet of Things sensor.

12. The system of claim 10 further comprising: receiving a message representing the failure, wherein the message is received from a user equipment.

13. The system of claim 10 further comprising: d determining the domain-by-domain scoring by at least determining a first score for a similarity between the object and the corresponding objects in the plurality of reference failure notices, a second score for a similarity with respect to problem code in the failure notice and the corresponding problem codes in the plurality of reference failure notices, and a third score for a similarity with respect to the free text description in the failure notice and the corresponding free texts in the plurality of reference failure notices.

14. The system of claim 10 further comprising: determining the domain-by-domain scoring by aggregating a score for each domain.

15. The system of claim 14 further comprising: normalizing the aggregate score into a range of zero to 1.

16. The system of claim 10 further comprising: determining the domain-by-domain scoring based on the first machine learning model, the second machine learning model, and the third machine learning model, each domain having a corresponding machine learning model to determine a sub-score which is aggregated to form an aggregate score.

17. The system of claim 10 further comprising: sending the generated message to at least a display associated with a user performing a solution to the failure.

18. The system of claim 10 further comprising: storing feedback received from at least a display associated with a user performing a solution to the failure, wherein the feedback mapped to at least a portion of the plurality of reference failure notices and/or enabling scoring.

19. A non-transitory computer-readable storage medium including program code which when executed causes operations comprising:
- receiving, at a recommendation system, a failure notice representing a failure detected by a sensor monitoring an object;
- comparing, by the recommendation system, the failure notice to a plurality of reference failure notices to identify at least one matching failure notice, the comparing based on a domain-by-domain scoring between the failure notice and the plurality of reference failure notices, the comparing further comprising comparing, in a first domain using a first machine learning model trained for the first domain, a problem code of the failure notice to corresponding problem codes in the plurality of reference failure notices, comparing, in a second domain using a second machine learning model trained for the second domain, a free text of the failure notice to corresponding free texts in the plurality of reference failure notice, and comparing, in a third domain using a third machine learning model trained for the third domain, the object of the failure notice to corresponding objects in the plurality of reference failure notice; and
- generating, by the recommendation system, a message including a suggested solution including at least one task to remedy the failure, the suggested solution obtained from the at least one matching failure notice.

20. The non-transitory computer-readable storage medium of claim 19, wherein the failure notice comprises a message received from the sensor comprising an Internet of Things sensor.

* * * * *